UNITED STATES PATENT OFFICE.

JULES LÉON BABÉ AND ALEXIS TRICART, OF PARIS, FRANCE.

PROCESS OF EXTRACTING ZINC.

SPECIFICATION forming part of Letters Patent No. 702,764, dated June 17, 1902.

Application filed June 29, 1900. Serial No. 22,067. (No specimens.)

*To all whom it may concern:*

Be it known that we, JULES LÉON BABÉ and ALEXIS TRICART, of Paris, France, have invented certain new and useful Improvements in Processes of Extracting Zinc, of which the following is a specification.

The object of this invention is to provide a simple and effective process by which metallic zinc can be economically obtained from low-grade zinc ores.

The invention consists for this purpose of the process hereinafter described, which comprises the steps of forming briquets from a mixture of the ore, carbonate of soda, and carbon, subjecting said briquets to the action of heat suitable for driving off the zinc-vapors therefrom, whereby a condensation product containing zinc oxid is formed, mixing said condensation product with carbonate of soda and carbon, subjecting said mixture to suitable heat for driving off the metallic zinc in the form of vapors, and condensing said vapors.

In carrying out our improved process, for example, with calamin the ore is first calcined to twenty per cent. and pulverized. To the pulverized mass is added a solution of eighty kilos of carbonate of soda in two hundred and fifty liters of water. To this is added thirty kilos of coke-dust or powdered charcoal. The whole is well mixed and forms a pasty mass, which can be cut with a spade into blocks or briquets of any desired dimensions. These blocks are then dried and after drying introduced into a suitable retort and heated therein to such extent as to expel the zinc. The vapors are condensed, and the resulting condensation product is a powder weighing about two hundred and fifty kilograms and consisting of various compounds of zinc, but chiefly zinc oxid. The metallic zinc contained in this form is from sixty to seventy per cent. of the mass. This product is then mixed with thirty to forty kilos of carbonate of soda and thirty kilos of coke-dust or powdered charcoal and this mixture placed in closed retorts and heated to a temperature of 800° to 1,000° centigrade for about two hours. The metallic zinc passes off during this heating in the form of zinc-vapors. The yield of metallic zinc is from one hundred and sixty to one hundred and seventy kilograms for each ton of ore treated.

The advantage of our improved process lies in the two treatments with fresh carbonate of soda instead of one treatement only, as heretofore. When but a single charge of carbonate of soda is used, which is introduced initially and the mixture then treated directly for distilling off the zinc, a high heat and long heating are required. We have found, however, that if the process be divided into two parts, first a preliminary treatment by formation of the ore with carbonate of soda and carbon into briquets for elimination of the gangue or earthy substance, so that the same does not enter into the subsequent operations, and then treating the condensation product with a fresh quantity of carbonate of soda and carbon, the amount of heat required is lessened, the time consumed is shortened, and the amount of carbon necessary to be employed is reduced.

Having thus described our invention, we claim as new and desire to secure by Letters Patent—

1. The process herein described of extracting metallic zinc from ores poor in zinc, which consists in forming briquets from a mixture of the ore, carbonate of soda and carbon, subjecting said briquets to the action of heat suitable for driving off the zinc-vapors from said briquets, condensing the said vapors driven off, whereby a condensation product containing zinc oxid is formed, mixing said product with carbonate of soda and carbon, subjecting said mixture to a suitable temperature for driving off the metallic zinc in the form of vapors, and condensing said vapors, substantially as set forth.

2. The process herein described of extracting metallic zinc from ores poor in zinc, which consists in forming briquets from a mixture of the ore, carbonate of soda and carbon, subjecting said briquets to the action of heat suitable for driving off the zinc-vapors from said briquets, condensing said vapors, whereby a condensation product containing zinc oxid is formed, mixing said product with carbonate of soda and carbon, subjecting the mixture to a temperature of from 800° to 1,000° centigrade for about two hours, and condensing the vapors of metallic zinc distilling off therefrom, substantially as set forth.

In testimony whereof we have signed this specification in the presence of two subscribing witnesses.

JULES LÉON BABÉ.
ALEXIS TRICART.

Witnesses:
EMILE LEOBRET,
EDWARD P. MACLEAN.